United States Patent Office 3,698,867
Patented Oct. 17, 1972

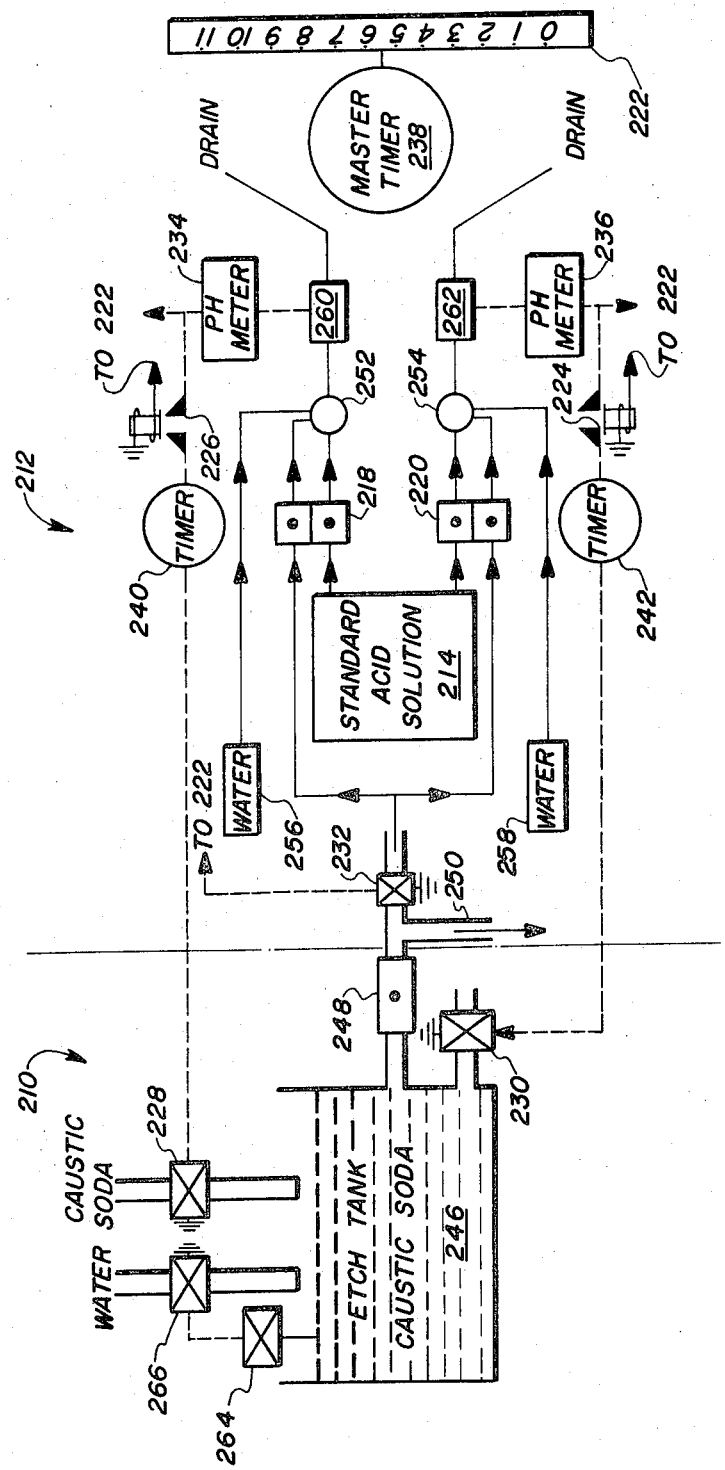

3,698,867
METHOD OF ANALYZING AND CONTROLLING ETCHANT SOLUTION CONCENTRATIONS
Ewald J. Bielefeld, Jr., Benbrook, and Maurice J. Puma, Fort Worth, Tex., assignors to General Dynamics Corporation
Original application Oct. 9, 1968, Ser. No. 766,161. Divided and this application Mar. 29, 1971, Ser. No. 129,257
Int. Cl. C23f *1/08;* G05d *11/08;* G01n *31/16*
U.S. Cl. 23—230 A                                      3 Claims

ABSTRACT OF THE DISCLOSURE

A method and apparatus for the automatic monitoring, analyzing and controlling of the etch rate and chemical concentration of a chemical milling solution responsive to pH values at first and second equivalence points for both caustic soda and inhibitor.

---

Figure 1:
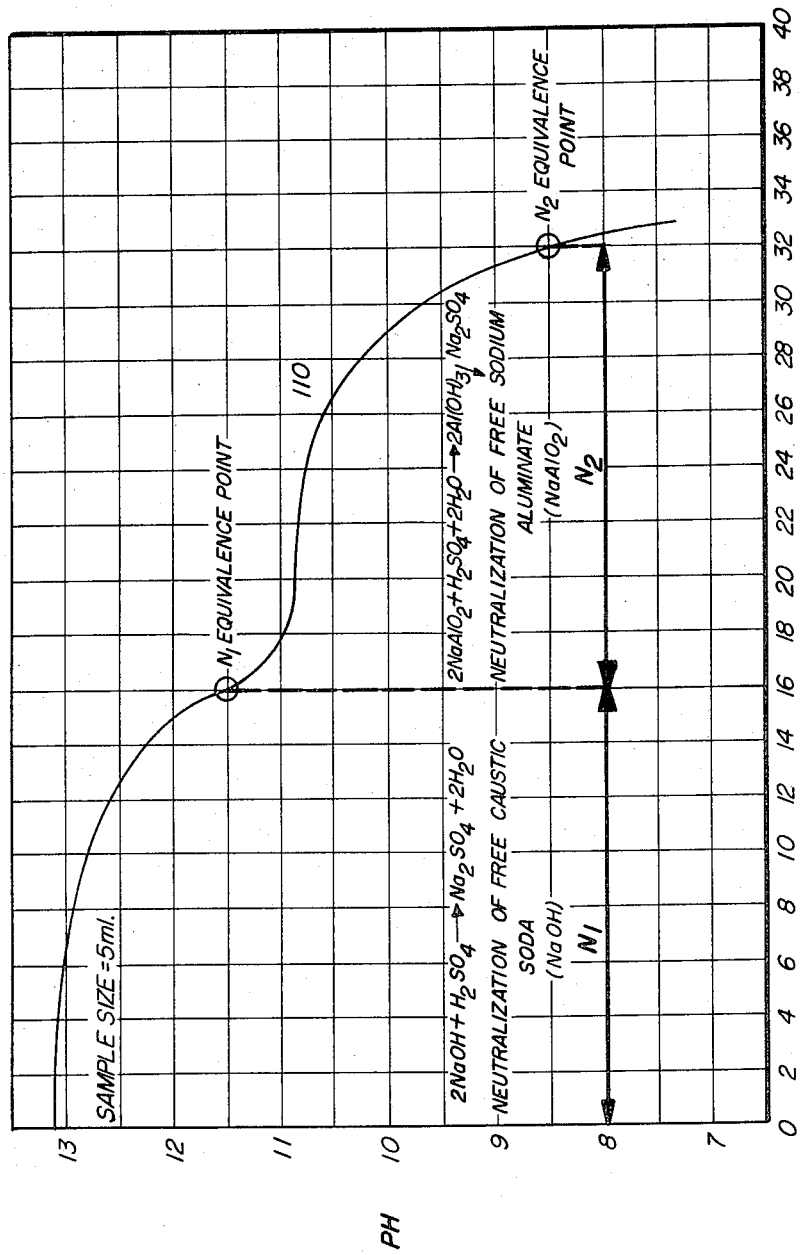

This is a division of our co-pending application Ser. No. 766,161, filed Oct. 9, 1968 now U.S. Pat. No. 3,607,549.

The invention herein described was made in the course of or under a contract or subcontract thereunder, with the Department of the Air Force.

The present invention relates generally to a method and apparatus for automatically sampling, analyzing and controlling chemical milling solutions.

More particularly this invention is directed to a process and related instrumentation for sampling, analyzing and controlling the relative strength of aluminum chemical milling solutions which involves simultaneous titration of two sample portions to bring each near one of the two equivalence points.

PRIOR ART

In the past, etchant solution analyses have been performed by manually sampling and analyzing the etchant solution. Results of the analysis required manual computation to determine necessary corrective action—such as tank drain-off or replenishment of depleted chemicals—both of which corrections were also, of necessity, performed manually.

Several disadvantages are inherent in this prior art operation which the present invention obviates. The manual method is time consuming, and the lag time between analysis and corrective action prevents the maintenance of the precise concentrations necessary for a constant and uniform etch rate. The invention also permits the elimination of human errors and prevents interruption of production during the period in which corrective action is being taken.

BRIEF SUMMARY OF THE INVENTION

This invention affords an automatic chemical sampler, analyzer and controller which provides a method and means by which chemical milling solutions may be automatically monitored, analyzed and controlled during all phases of chemical milling or etching through a coordination and metering of material pumps and pH meters which are set at desired, predetermined values, variances from these values beyond predetermined critical limits at either or both equivalence points initiating signals which in turn activate control valves at the chemical milling tanks, corrective action being taken constantly and automatically, thereby maintaining constant chemical concentrations and etch rate, which in context of the often critical "degree" of etch in present applications is of prime importance.

The invention will be readily understood by those versed in the art when taken in context of the following specification and related drawings, wherein:

FIG. 1 is a typical titration curve for an aluminum etch tank showing the two equivalence points resulting from the neutralization of the sample with a standardized acid solution; and FIG. 2 is a schematic plan view of a typical production tank constructed in accordance with the present invention and showing the relationship of the various components to each other and to the system.

The process for carrying out the invention is applicable to substantially all solutions of this type, however, as an exemplary and preferred process the analysis of caustic soda and sodium aluminate is described herein since it is the most common process employed by the industry.

Referring first to FIG. 1, the analysis of $N_1$ (caustic soda) and $N_2$ (sodium aluminate) may be described briefly as follows:

A 5 milliliter sample of etchant is taken and neutralized to a pH of 11.5 with one normal acid. The number of milliliters of one normal acid required to reach a pH of 11.5 on a 5 milliliter sample is defined to be the $N_1$ value, FIG. 1, and is a measure of the free caustic soda. Upon adding more acid the sodium aluminate is converted to aluminum hydroxide with another change in pH from 11.5 to 8.5. The number of milliliters of one normal acid required to lower the pH from 11.5 to 8.5 on a 5 milliliter sample is defined to be the $N_2$ value and is a measure of the inhibitors (primarily sodium aluminate). The $N_1$ and $N_2$ equivalence points are shown in the titration curve 110.

Referring now to FIG. 2, a system constructed according to the present invention is shown as generally comprising an etch tank section 210 and a control section 212. Etch tank section 210, wherein the actual etching is accomplished, is controlled by control section 212 which accomplishes the pH analysis and performs the necessary corrective action based on the analysis. If standard acid solution 214 and the etch tank solution 216 are allowed to flow via dual metering pumps 218, 220 at a constant rate, and mixed with water in the mixing chambers 252, 254, to avoid excessive buildup of heat, a neutralization reaction occurs. If the acid in the solution 214 is exactly equivalent to the caustic soda in the etch solution 216, the resultant pH will be 11.5 as determined by the titration curve, FIG. 1. A pH of less than 11.5 would mean an acid condition or a caustic soda deficiency requiring corrective action, i.e., addition of caustic soda to the etchant solution 216 and is readily detected by use of the present invention because the caustic exhibits a sharp change in pH value at the first equivalence ($N_1$) point. On the other hand, a pH of more than 11.5 would mean an alkaline condition or an excess of caustic soda requiring no corrective action. Similar but opposite pH changes occur for the sodium aluminate (inhibitor) analysis with corrective action (drain off) being taken above 8.5 pH, also readily detected because the inhibitor exhibits a sharp change in pH at the second equivalence ($N_2$) point.

A typical cycle for an etch tank solution analyzer and controller is described below. Although only one tank system is described in the interest of clarity, it is apparent that any number may be controlled by expanding the system. Briefly, prior to being electrically activated, the unit is set at the zero point on the stepping relay 222, FIG. 2. Relays 224, 226 are open, and all addition valves 228, drain valves 230 and sample valves 232 are closed. The master switch activates both pH meters 234, 236, master timer 238, and metering pumps 218, 220. The water flow is constant and is manually set at the water injection meters 256, 258. The master timer 238 is preset to pulse stepping relay 222 which in turn controls the entire sequence of operations. The odd numbered contacts 1, 3, 5, 7 and 9 on stepping relay 222 are sample purging steps where no pH meter signals are transmitted. The continuity of numbers on the stepping relay 222 indicates that it controls more than one tank, however, since this specification shows the operation of only one tank, there are only two settings pertinent here, positions 1 and 2. The zero point indicates the inoperative or shut off position. Master timer 238 is preset to hold stepping relay 222 on position number "1" contact for sufficient time to purge the solution flow system. Position number "2" on stepping relay 222 activates relays allowing pH meter signals to pass to timers 240, 242, the former controlling addition valve 228 and the latter drain valve 230, the pH meter signals being responsive to any variation in equivalence points for which the pH meters are set. The dwell time on position number "2" contact is only long enough for the pH meter to signal the appropriate timers should corrective action be necessary. Thus, each etch tank is analyzed and corrective action taken in sequence, automatically and continuously.

It should be noted that the water to mixing chambers 252, 254 is required to dissipate the heat of reaction and does not affect the resultant pH (hydrogen ion concentration).

The cycle begins as above noted, by purging control section 212, in which master timer 238 pulses stepping relay 222 to contact point number "1." As seen in FIG. 2, sample solenoid valve 232 to etch tank 246 is opened allowing a sample of etchant 216 from a continuously flowing etchant stream flowing from the etch tank 246 through flow pump 248 to continuous drain 250, to be diverted through solenoid sample valve 232, which etchant is then pumped through metering pumps 218, 220 to mixing chambers 252, 254 where the metered sample of etchant solution is thoroughly mixed with "36 normal acid" ($H_2SO_4$) solution and diluted with water controlled by water injection meters 256, 258 before passing to flow chambers 260, 262 where the pH measurements are made. The sample and acid flow rates are preset in metering pumps 218, 220 which are adjusted to be compatible with the desired equivalence points as indicated at $N_1$, $N_2$ of FIG. 1. Again referring to FIG. 2, metering pumps 218, 220 pump etchant and standard acid solutions continuously while the solution controller device is "on" and are not controlled or affected by any automatic action of the solution controller device. Concurrently with the above, when the solution purging period is complete and master timer 238 pulses stepping relay 222 to contact point "2," relays 224, 226 are closed responsive to contact point "2." This completes the circuits from the pH meters 234, 236 to the timers 240, 242.

The pH meters 234, 236 "read" the pH of the solutions flowing through flow chambers 260, 262 continuously, but signals are not transmitted unless the pH is below the $N_1$ or above the $N_2$ set points. For example, the $N_1$ flow chamber 260 should have a pH reading above 11.5 to be in proper concentration range. An etch solution depleted in caustic soda will not use all of the allotted acid, resulting in a lower pH reading which indicates a more acid condition. Should the pH fall below 11.5 the $N_1$ pH meter 234 is preset to send an electrical signal through closed relay 226 to timer 240 which in turn controls caustic soda addition valve 228 to etch tank 246. This allows replenishment of caustic soda to etch tank 246 for a preset time period and is independent of other action during the cycle. Similarly, the $N_2$ pH meter 236 should have a pH reading of less than 8.5 to be in proper range. A solution having a higher than desired inhibiting content (sodium aluminate) will have a higher pH than 8.5 since the increase of sodium aluminate will use up the "neutralizing" acid. A pH reading greater than the preset 8.5 will cause the $N_2$ pH meter 236 to send an electrical signal through relay 224 which in turn activates timer 242 controlling drain valve 230 on etch tank 246. This allows etch solution 216 in etch tank 246 to drain for a preset time, thereby reducing the excess aluminum buildup. Timers 240, 242 automatically reset for the next cycle and a constant level control 264 is independently activated to allow addition of water through valve 266 to etch tank 246.

At the completion of the first tank analysis, master timer 238, which drives stepping relay 222, pulses stepping relay 222 to contact point number "3." This allows relays 224 and 226 to open and sample valve 232 to close. Sample valves are attached to each of the other tanks in the system (not shown) in the same manner in which sample valve 232 is attached to etch tank 246 and are opened sequentially so that the purging, analysis and corrective action process for all tanks occur in the same manner as that described for the etch tank 246 shown. When the cycle has completed for all tanks, stepping relay 222 resets and the cycle repeats itself.

In summary, the present invention for the first time provides a method and its associated system for continuously, automatically analyzing and controlling etch solutions conssiting of a container having a constant level control for the solution to be analyzed, and which includes a means of adding ingredients to or removing them from the container solution. The solution is automatically sampled responsive to an impulse from a stepping relay, treated with a standard solution and pumped through flow chambers where the pH value is measured for both caustic and inhibitor simultaneously and independently, the pH value then activating timer means to add caustic or delete inhibitor in the container in accordance with and responsive to the readings thus derived.

We claim:
1. The method for automatically analyzing and controlling the concentration of an etchant solution which includes caustic and inhibitor comprising the steps of:
   (A) determining the desired chemical concentration of the etchant solution and the critical limits thereof based on first and second equivalence points of a standard etchant solution;
   (B) causing the etchant solution to be periodically and automatically sampled;
   (C) causing the etchant solution sample to be equally distributed to first and second mixing chambers respectively, and in said first mixing chamber mixing one etchant solution sample portion with a predetermined amount of standard neutralizing solution corresponding to the first equivalence point of the standard etchant solution, in said second mixing chamber mixing the other etchant solution portion with a second predetermined amount of standard neutralizing solution corresponding to the second equivalence point of the standard etchant solution, and sensing the proximity of the mixed portions to the first and second equivalence points respectively;
   (D) automatically determining from said sensing any deviation beyond the first and second equivalence point critical limits of the etchant concentration;
   (E) automatically making an adjustment to the etchant solution concentration responsive to said determined deviation, to thereby maintain the etchant solution concentration within said critical limits.
2. The method for controlling an etchant solution defined by claim 1 wherein:
   (A) said sampling comprises withdrawing etchant solution at a set flow rate and predetermined intervals by a solenoid activated metering device;
   (B) said mixing comprises withdrawing said neutralizing solution simultaneously at a predetermined rate via a metering device for each etchant sample portion and causing the etchant sample portions and neutralizing solutions to mix and the sensing step comprises sensing the hydrogen ion concentration resultant from said mixing step;
   (C) said determination step comprises generating a signal which corresponds to the degree of variation in caustic or inhibitor of said solution from said desired concentration outside said predetermined equivalence point critical limits;

(D) said adjustment comprises selectively adding chemical to the etchant solution where said determination step indicates depletion of caustic or draining the etchant solution in the work tank where said determination step indicates an excess of inhibitor responsive to the result of said determination step.

3. The method defined in claim 1 wherein said automatic analyzing and controlling of an etchant solution comprises the steps of:

(A) activating a solenoid by pulses from a timer actuated stepping relay which has been preset to desired time intervals, thereby allowing withdrawal at the proper flow rate of the etchant solution sample via a metering device;

(B) testing the said mixed solution portions for hydrogen ion concentration simultaneously and independently with plural pH meters to determine the degree of variation in both caustic and inhibitor from a desired predetermined working concentration;

(C) wherein said adjustment comprises selectively actuating valve means responsive to the pH meters to either allow addition of chemical to the solution or drainage of solution from the etchant container in conformance to said preset values.

References Cited
UNITED STATES PATENTS

| | | | |
|---|---|---|---|
| 1,684,645 | 9/1928 | Smith et al. | 23—230 A |
| 2,627,453 | 2/1953 | Sheen | 23—253 R |
| 2,977,199 | 3/1961 | Quittner | 23—253 A |
| 3,195,982 | 7/1965 | Nicholson | 23—230 A |

MORRIS O. WOLK, Primary Examiner

D. G. MILLMAN, Assistant Examiner

U.S. Cl. X.R.

23—253 A